(12) United States Patent
House et al.

(10) Patent No.: US 9,388,732 B2
(45) Date of Patent: Jul. 12, 2016

(54) SPRING BIASED SEALING METHOD FOR AN ACTUATING SHAFT

(75) Inventors: Timothy House, Hendersonville, NC (US); Paul Diemer, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 432 days.

(21) Appl. No.: 13/977,079

(22) PCT Filed: Dec. 21, 2011

(86) PCT No.: PCT/US2011/066349
§ 371 (c)(1),
(2), (4) Date: Jun. 28, 2013

(87) PCT Pub. No.: WO2012/094153
PCT Pub. Date: Jul. 12, 2012

(65) Prior Publication Data
US 2013/0287552 A1  Oct. 31, 2013

Related U.S. Application Data

(60) Provisional application No. 61/430,668, filed on Jan. 7, 2011.

(51) Int. Cl.
| | | |
|---|---|---|
| *F01D 17/16* | (2006.01) | |
| *F02B 33/00* | (2006.01) | |
| *F01D 11/00* | (2006.01) | |
| *F01D 17/20* | (2006.01) | |
| *F02B 37/18* | (2006.01) | |
| *F02C 6/12* | (2006.01) | |
| *F16J 15/18* | (2006.01) | |
| *F16K 1/20* | (2006.01) | |

(52) U.S. Cl.
CPC ............. *F02B 33/00* (2013.01); *F01D 11/003* (2013.01); *F01D 17/165* (2013.01); *F01D 17/20* (2013.01); *F02B 37/186* (2013.01); *F02C 6/12* (2013.01); *F16J 15/186* (2013.01); *F16K 1/2078* (2013.01); *F05D 2240/55* (2013.01); *F05D 2250/90* (2013.01); *F05D 2260/38* (2013.01); *Y02T 10/144* (2013.01); *Y10T 29/49236* (2015.01)

(58) Field of Classification Search
CPC ...... F01D 11/003; F01D 17/165; F01D 17/14; F01D 25/24; F05D 2220/40; F05D 2220/55; F05D 2250/90; F05D 2260/38; F02C 7/042; F02C 6/12; F16J 15/186
See application file for complete search history.

(56) References Cited

U.S. PATENT DOCUMENTS

| | | | | |
|---|---|---|---|---|
| 4,659,295 A | * | 4/1987 | Burdette | F01D 17/165 415/164 |
| 4,804,316 A | * | 2/1989 | Fleury | F01D 17/165 415/134 |

(Continued)

FOREIGN PATENT DOCUMENTS

| | | |
|---|---|---|
| EP | 2253816 | 11/2010 |
| JP | 05248253 | 9/1993 |
| JP | 2008106823 | 5/2008 |

*Primary Examiner* — Ninh H Nguyen
(74) *Attorney, Agent, or Firm* — A. Michael Tucker; Stephen A. Pendorf; Patent Central LLC

(57) ABSTRACT

The propensity for gas and soot leakage around a shaft, which extends through a bore which connects volumes of differing pressures, e.g., a turbocharger turbine housing and the ambient air, is minimized with the addition of a pair of seal rings axially biased by a spring to provide a continuous gas and soot seal. The spring may bias the seal rings apart from each other or towards each other.

19 Claims, 7 Drawing Sheets

(56) References Cited

U.S. PATENT DOCUMENTS

| | | |
|---|---|---|
| 6,273,058 B1 | 8/2001 | Wagner |
| 6,599,087 B2 * | 7/2003 | Arnold ................. F01D 11/003 415/163 |
| 7,080,510 B2 * | 7/2006 | Ishihara ................ F02B 37/183 251/14 |
| 7,644,583 B2 | 1/2010 | Leavesley |
| 2005/0079049 A1 | 4/2005 | Ishihara et al. |
| 2006/0213195 A1 | 9/2006 | Leavesley |
| 2006/0232015 A1 | 10/2006 | Lederer et al. |

\* cited by examiner

SPRING BIASED SEALING METHOD FOR AN ACTUATING SHAFT

FIELD OF THE INVENTION

This invention addresses the need for an improved shaft sealing design for a turbocharger shaft which passes through the walls of a turbine housing.

BACKGROUND OF THE INVENTION

Turbochargers are a type of forced induction system. They deliver air, at greater density than would be possible in the normally aspirated configuration, to the engine intake, allowing more fuel to be combusted, thus boosting the engine's horsepower without significantly increasing engine weight. A smaller turbocharged engine, replacing a normally aspirated engine of a larger physical size, will reduce the mass and can reduce the aerodynamic frontal area of the vehicle.

Turbochargers use the exhaust flow from the engine exhaust manifold to drive a turbine wheel (21), which is located in the turbine housing (2). Once the exhaust gas has passed through the turbine wheel and the turbine wheel has extracted energy from the exhaust gas, the spent exhaust gas exits the turbine housing and is ducted to the vehicle downpipe and usually to after-treatment devices such as catalytic converters, particulate traps, and $NO_x$ traps.

In a wastegated turbocharger, the turbine volute is fluidly connected to the turbine exducer by a bypass duct. Flow through the bypass duct is controlled by a wastegate valve (61). Because the inlet of the bypass duct is on the inlet side of the volute, which is upstream of the turbine wheel, and the outlet of the bypass duct is on the exducer side of the volute, which is downstream of the turbine wheel, flow through the bypass duct, when in the bypass mode, bypasses the turbine wheel, thus not powering the turbine wheel. To operate the wastegate, an actuating or control force must be transmitted from outside the turbine housing, through the turbine housing, to the wastegate valve inside the turbine housing. A wastegate pivot shaft extends through the turbine housing. Outside the turbine housing an actuator (73) is connected to a wastegate arm (62) via a linkage (74), and the wastegate arm (62) is connected to the wastegate pivot shaft (63). Inside the turbine housing, the pivot shaft (63) is connected to the wastegate valve (61). Actuating force from the actuator is translated into rotation of the pivot shaft (63), moving the wastegate valve (61) inside of the turbine housing. The wastegate pivot shaft rotates in a cylindrical bushing (68), or directly contacts the turbine housing. Because an annular clearance exists between the shaft and the bore of the bushing, in which it is located, an escape of hot, toxic exhaust gas and soot from the pressurized turbine housing is possible through this clearance.

Turbine housings experience great temperature flux. The outside of the turbine housing faces ambient air temperature while the volute surfaces contact exhaust gases ranging from 740° C. to 1050° C. depending on the fuel used in the engine. It is essential that the actuator, via the translated motions described above, be able to control the wastegate to thereby control flow to the turbine wheel in an accurate, repeatable, non jamming manner.

A VTG is used not only to control the flow of exhaust gas to the turbine wheel but also to control the turbine back pressure required to drive EGR exhaust gas, against a pressure gradient, into the compressor system to be re-admitted into the combustion chamber. The back pressure within the turbine system can be in the region of up to 500 kPa. This high pressure inside the turbine stage can result in the escape of exhaust gas to the atmosphere through any apertures or gaps. Passage of exhaust gas through these apertures is usually accompanied by black soot residue on the exit side of the gas escape path. This soot deposit is unwanted from a cosmetic standpoint, and the escape of said exhaust gas containing CO, $CO_2$, and other toxic chemicals can be a health hazard to the occupants of the vehicle. This makes exhaust leaks a particularly sensitive concern in vehicles such as ambulances and buses. From an emissions standpoint, the gases which escape from the turbine stage are not captured and treated by the engine/vehicle aftertreatment systems.

Typically, some of the leakage of gas and soot through the annulus formed by a shaft rotating within a cylindrical bore was tolerated since the end faces of the bushing are usually in contact with either the inboard flange of the valve arm or the outboard flange or surface of the driving arm of the wastegate control mechanism, thus blocking leakage some of the time.

Seal means such as seal rings, sometimes also called piston rings, are commonly used within a turbocharger to create a seal between the static bearing housing and the dynamic rotating assembly (i.e., turbine wheel, compressor wheel, and shaft) to control the passage of oil and gas from the bearing housing to both compressor and turbine stages and vice versa. BorgWarner has had seal rings for this purpose in production since at least 1954 when the first turbochargers were mass produced. For a shaft with a seal ring boss of 19 mm diameter, rotating at 150,000 RPM, the relative rubbing speed between the seal ring cheek and the side wall of the seal ring groove is of the order of 149,225 mm/sec.

Seal rings, of the variety which are used as described above, are sometimes used as a sealing device for relatively slowly rotating shafts (as compared to the 150,000 RPM turbocharger rotating assembly seals). These slowly rotating shafts move in rotational speeds of the order of 15 RPM which equates to a relative rubbing speed of 7 to 8 mm/sec.

Seal rings, as used in turbochargers, create a seal by contacting part of the side wall of the seal ring against one side wall of the seal ring groove and contacting the outside diameter of the seal ring against the inside diameter of the bore in which the shaft resides. In order for the ring to be assembled to the shaft and then the shaft and ring be assembled into a bore, the depth of the seal ring groove must be such that the ring can collapse in outside diameter (and thus effective circumference and inside diameter) so that the outside diameter of the seal ring can assume approximately the inner diameter of the bore in which it operates. FIG. 2A depicts a seal ring (80) in the naturally expanded condition, albeit assembled to the shaft by forcibly expanding the ring over the diameter of the shaft (63) and then allowing the ring to relax into the groove. As the shaft, with the ring assembled on it, is pushed into the bore of the bushing (68), a chamfer (69) compresses the ring until the outside diameter of the ring can slide in the inside diameter (70) of the bushing. The now-compressed ring seals against the inside diameter of the bushing at any axial position of the shaft.

In this condition, as depicted in FIG. 3, the seal ring (80) can axially reside at any axial position within the confines of the ring groove, the seal ring groove being defined as: the volume between the radial elements of the outside diameter of the shaft (86) and the diameter of the floor (82) of the seal ring groove; and the distance between the inner (83) and outer (81) walls of the seal ring groove. With this definition of the seal ring groove, it can be seen that there always exists a volume under the ring, (ie between the inside diameter (84) of the compressed piston ring, and the diameter of the floor (82) of the seal ring groove. There also can exist a volume between the inner wall (83) of the seal ring groove and the proximate wall of the seal ring. On the opposite side of the seal ring groove, there can also exist a volume between the outer wall (81) of the seal ring groove and the proximate wall of the seal ring. FIG. 3 depicts a condition in which the seal ring (80) is somewhat centered between the inner and outer walls (83 and 81) of the seal ring groove, thus allowing passage of gas and soot (86) around the seal ring. Since the axial position of the seal ring is controlled by the friction between the inner diameter of the bore in the bushing, and the ring is only moved by any contact with a side wall of a groove, a nearly complete sealing condition only exists when the seal ring sidewall is in direct contact with a seal ring groove side wall. In any other axial condition, the leakage path depicted in FIG. 3 exists.

Various arrangements of seal rings are known, each arrangement operating in a slightly different manner. In the case of a single seal ring as shown in FIG. 3, the fluid (e.g., exhaust gas) will flow from higher pressure to lower pressure. A significant pressure drop would occur across the seal ring. To improve the effectiveness of the seal, it is known to use two or more of such seal rings in sequence, each ring typically seated in it's own groove. In such a case, as the pressure moves in one direction across the seals, there would be a pressure drop across each seal ring, and the effect would be cumulative. In addition to such "passive" seals, "active" seals are also known. These introduce a slight level of pressure or vacuum into the space between two rings, thereby interrupting the flow of exhaust gas across the sequential seals. However, such an "active seal" system requires bores and/or piping to connect the space between the two ring seals with a source of pressure or vacuum. Further, only the slight pressure or vacuum necessary to achieve the desired "flow interruption" effect is used. The problem of exhaust gas flow past the individual ring seals is not addressed or solved by this system.

It would be advantageous to have a seal system that was improved over the known systems. It would also be advantageous to be able to retrofit a turbocharger with an improved seal system without requiring extensive modification of the turbocharger.

Thus it can be seen that there is a need for a design to produce a complete gas seal for, e.g., wastegate and VTG pivot shafts in turbochargers.

SUMMARY OF THE INVENTION

The present invention solves the above problems by incorporating spring means into the seal means for an actuator shaft in a turbocharger, the spring means forcing a plurality of seal rings to sealing contact in order to provide a continuous gas and soot seal between a chamber internally pressurized with exhaust gas and soot and the environment outside.

The invention is broadly accomplished by a turbocharger with an actuating mechanism located outside the turbocharger for actuating a device within a turbine housing, including a shaft which is rotatably mounted in a bore extending through the turbine housing for transmitting an actuating movement from the actuating mechanism to the device, wherein at least one of said shaft and said bore is associated with a circumferential space having first and second axial ends, wherein at least two generally annular seal members located in said space, and wherein a mechanical spring means to spring-bias both seal members axially.

The invention is also accomplished by a method for forming a seal between an actuating mechanism located outside a housing and a device within the housing, wherein the pressure inside the housing is different from the pressure outside the housing, wherein a shaft is rotatably mounted in a bore, wherein the bore extends through the housing, wherein the shaft is connected to the actuating mechanism outside the housing and to the device inside the housing for transmitting an actuating movement from the actuating mechanism to the device, the method comprising, in any order:

(a) forming an axial abutment in said shaft or bore;

(b) introducing at least two seal rings and a mechanical spring for axially biasing said seal rings onto said shaft or into said bore;

(c) a spacer onto said shaft or into said bore such that said seal rings and mechanical spring are located between said abutment and said spacer;

(d) introducing said shaft into said bore; and (e) connecting the shaft to the actuating mechanism outside the housing and to the device inside the housing for transmitting an actuating movement from the actuating mechanism to the device.

BRIEF DESCRIPTION OF THE DRAWINGS

The present invention is illustrated by way of example and not limitation in the accompanying drawings in which like reference numbers indicate similar parts, and in which.

DETAILED DESCRIPTION OF THE INVENTION

Gas and soot leakage from within a turbocharger to the ambient clean air surrounding a turbocharger is not permitted by engine manufacturers. Turbocharger manufacturers have been using piston rings, or seal rings, to seal gases and oil from communicating between the bearing housing cavity and either or both turbine and compressor stages ever since turbochargers were first in mass production in Diesel engines in the 1950s. So the engineering and application of such a seal is logical for any gas or material seal in less demanding locations on a turbocharger.

Figure 1:
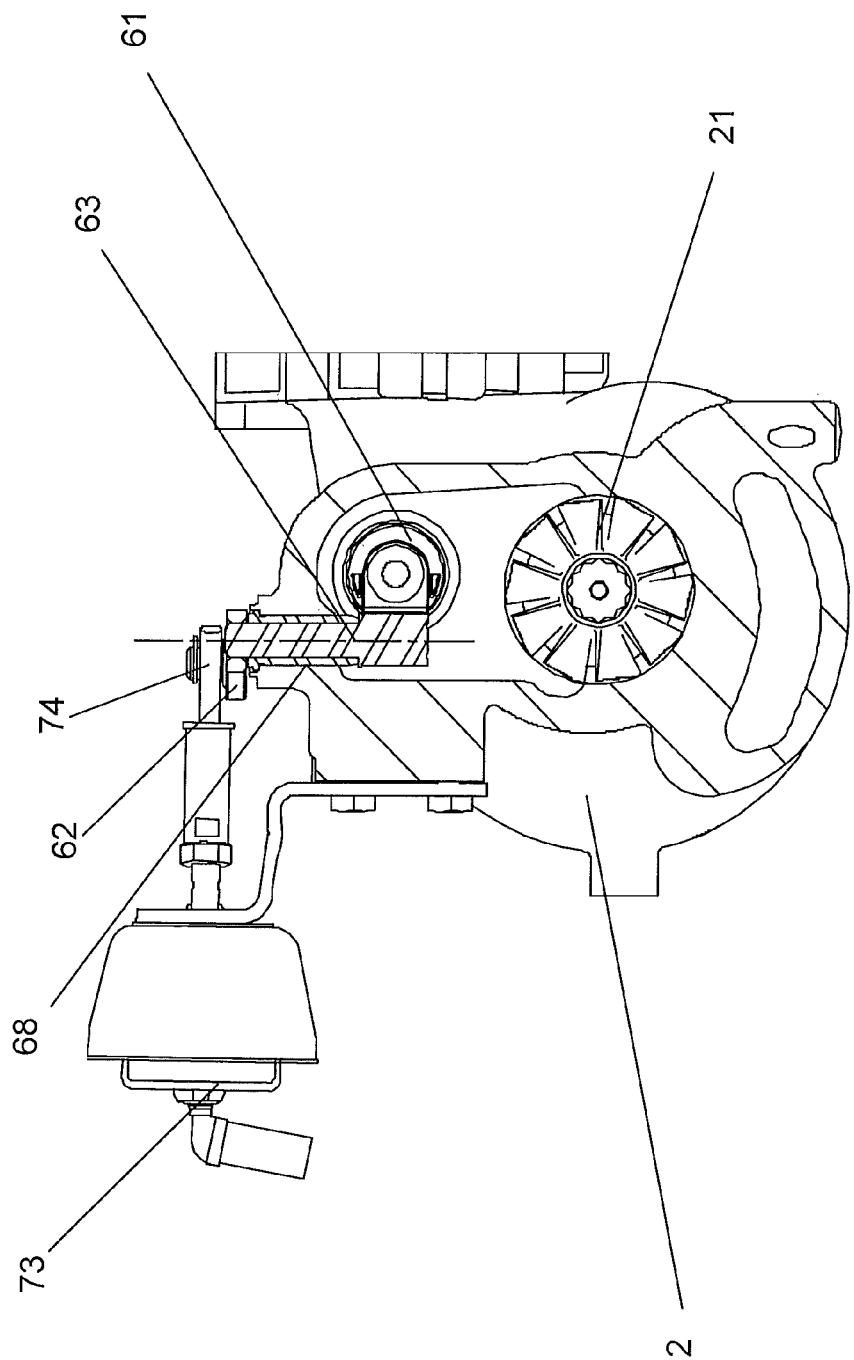
FIG. 1 depicts a the section for a typical wastegate turbocharger.
Figure 2:
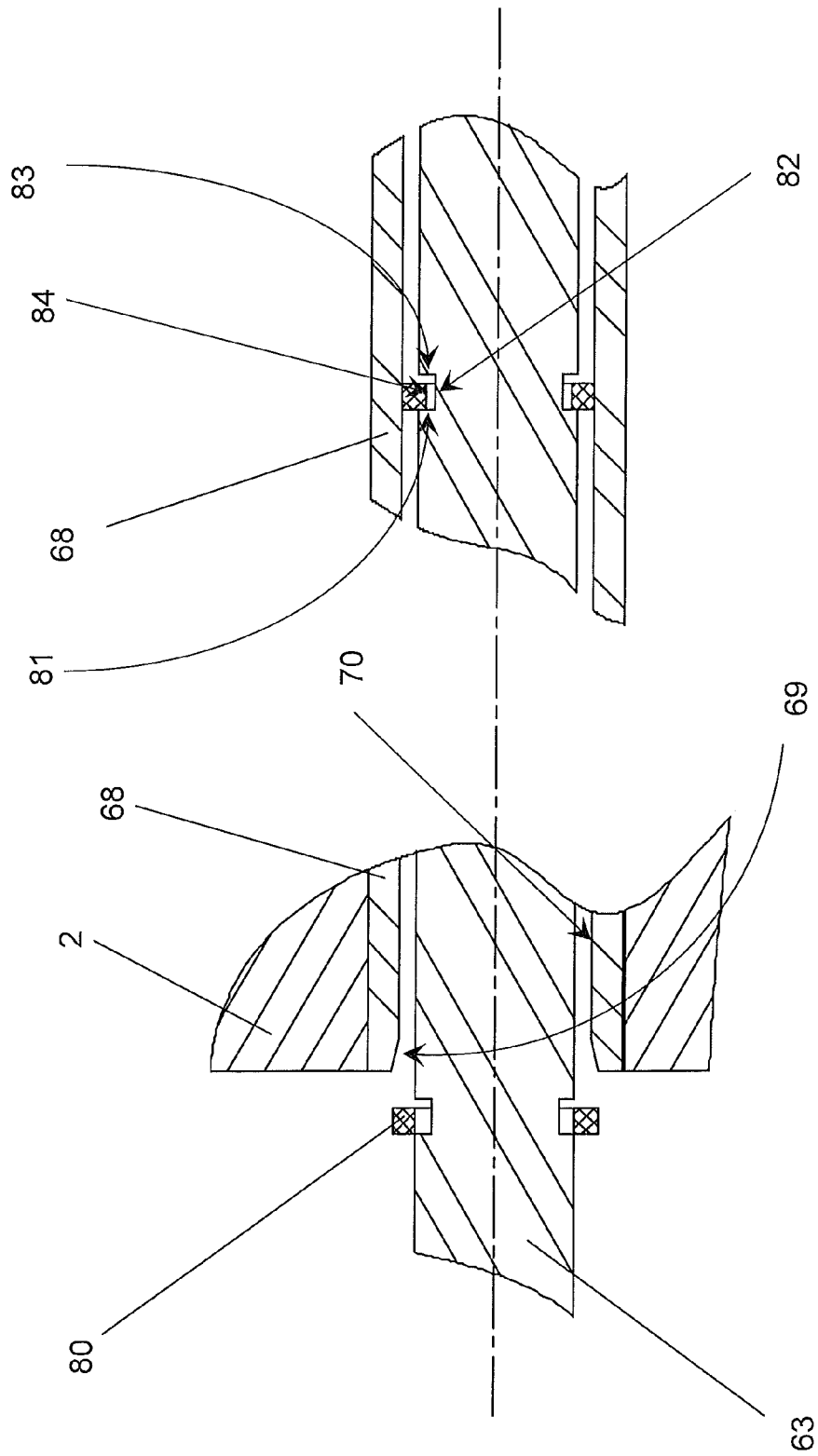
FIGS. 2A,B depict two sections showing seal ring compression.
Figure 3:
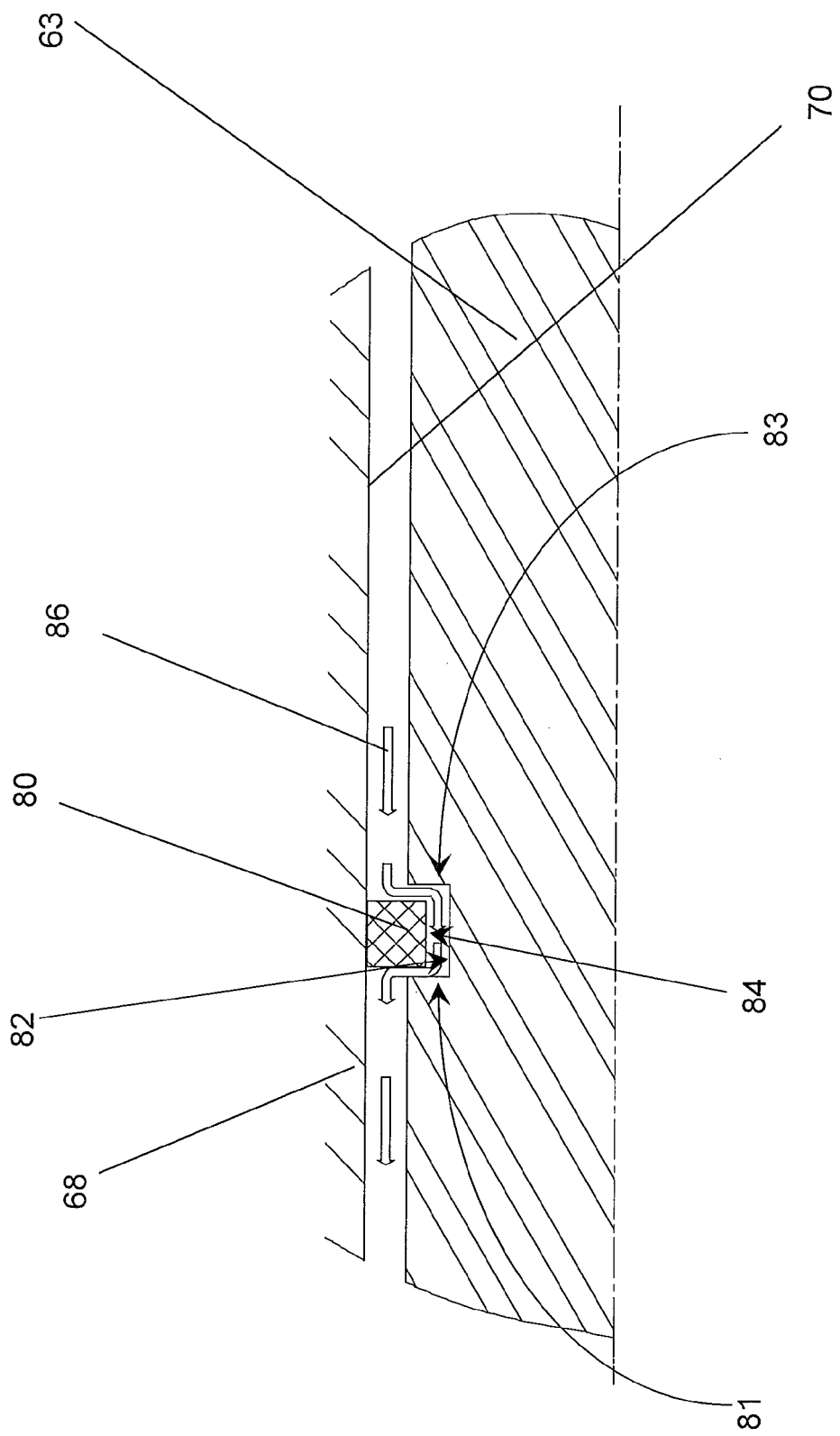
FIG. 3 depicts a section view showing gas leakage passage.

A section through a typical assembled seal ring, as depicted in FIGS. 2 and 3 viewed perpendicular to the axis of the shaft on which it is assembled, has a narrow rectangular cross section which is partially disposed in either an annular groove in the shaft, or in the bore in which the shaft rotates, both methods providing a level of sealing between the shaft and its bore. Axially, the seal ring is preferably positioned towards one of the side walls of the seal ring groove. The groove is typically rectangular in section with the radial depth of the groove greater than the length of corresponding side of the seal ring. In the case of the seal ring groove being in the bore, this allows assembly of the seal ring in the seal ring groove by expansion of the seal ring, thus allowing the mating shaft to pass through the bore of the component. In the case of the seal ring groove being in the shaft, this allows assembly of the seal ring in the seal ring groove in the shaft by contraction of the seal ring, thus allowing the mating shaft and contracted seal ring to pass through the bore of the component until the seal ring is allowed to expand in its assembled configuration, as depicted in FIGS. 2A and 2B. The width of the rectangular groove is ideally close to the width of the seal ring to provide optimum sealing. Typically, the closer the widths of the groove and seal ring, the better the sealing capability, but the greater the propensity for the seal ring to seize in the groove.

The design of the seal ring is such that the approximate diameter of the relaxed shape of the ring at rest is greater than the diameter of the bore (70) into which it is assembled so, in the assembled state, the spring force of the contracted ring forces the outwards facing surface of the partial circumference of the seal ring against the inwards facing surface of the bore in which it is located. Of course, in an alternative embodiment the groove could also be located in the inwards facing surface of the bore, with the seal ring having a contracting spring force rather than expanding spring force.

Because of the hostile thermal and chemical environment, the pivot shaft is typically not fitted directly to a bore in the turbine housing per se, but more often to a bore of a stationary bushing or bearing (68) which is in turn located in a bore in the turbine housing (2). This is in order to better match thermal coefficients of expansion (to maintain close clearances) and to inhibit the galling potential, which is severe, between the material of the pivot shaft and the material of the turbine housing. The bushing is typically axially constrained by a pin (59) through a bore perpendicular to the axis of the bushing, piercing both the outside diameter of the bushing and the bore in the turbine housing, thus constraining the bushing in the turbine housing.

In an inventive configuration, using a plurality of seal rings, each seal ring mounted in its seal ring groove, on a wastegate or VTG pivot shaft, the inventors developed a design using at least two seal rings, with one ring on each side of a spring, each seal ring thus having one side face proximal to the spring and one side face distal to the spring, in which the seal rings are axially forced apart by the spring to create direct contact between an annular distal side face on each of the seal rings and an annular contacting side face on each of the constraining abutments.

Figure 4:
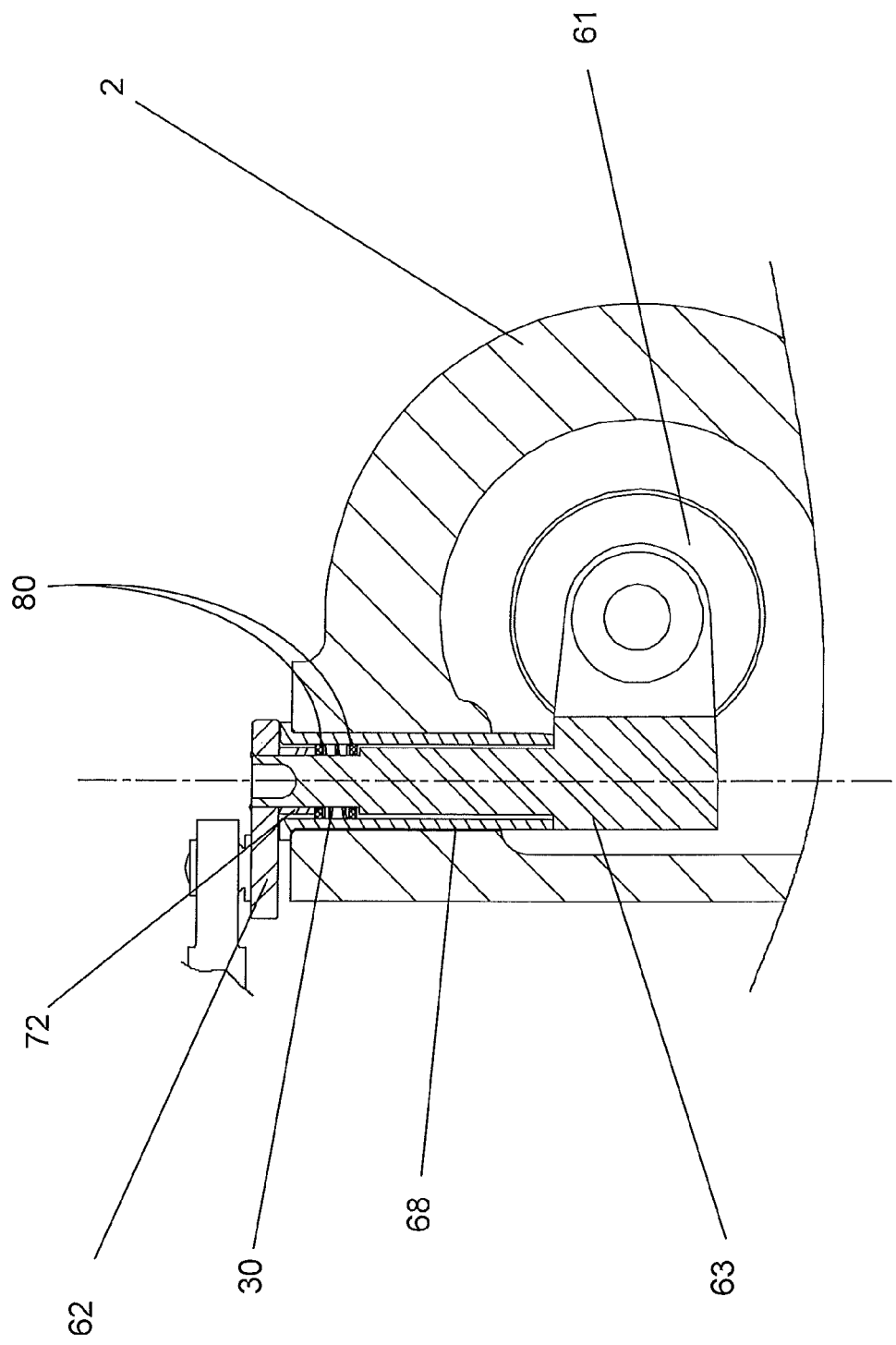
FIG. 4 depicts a section view of the inventive seal in a wastegate configuration.
Figure 5:
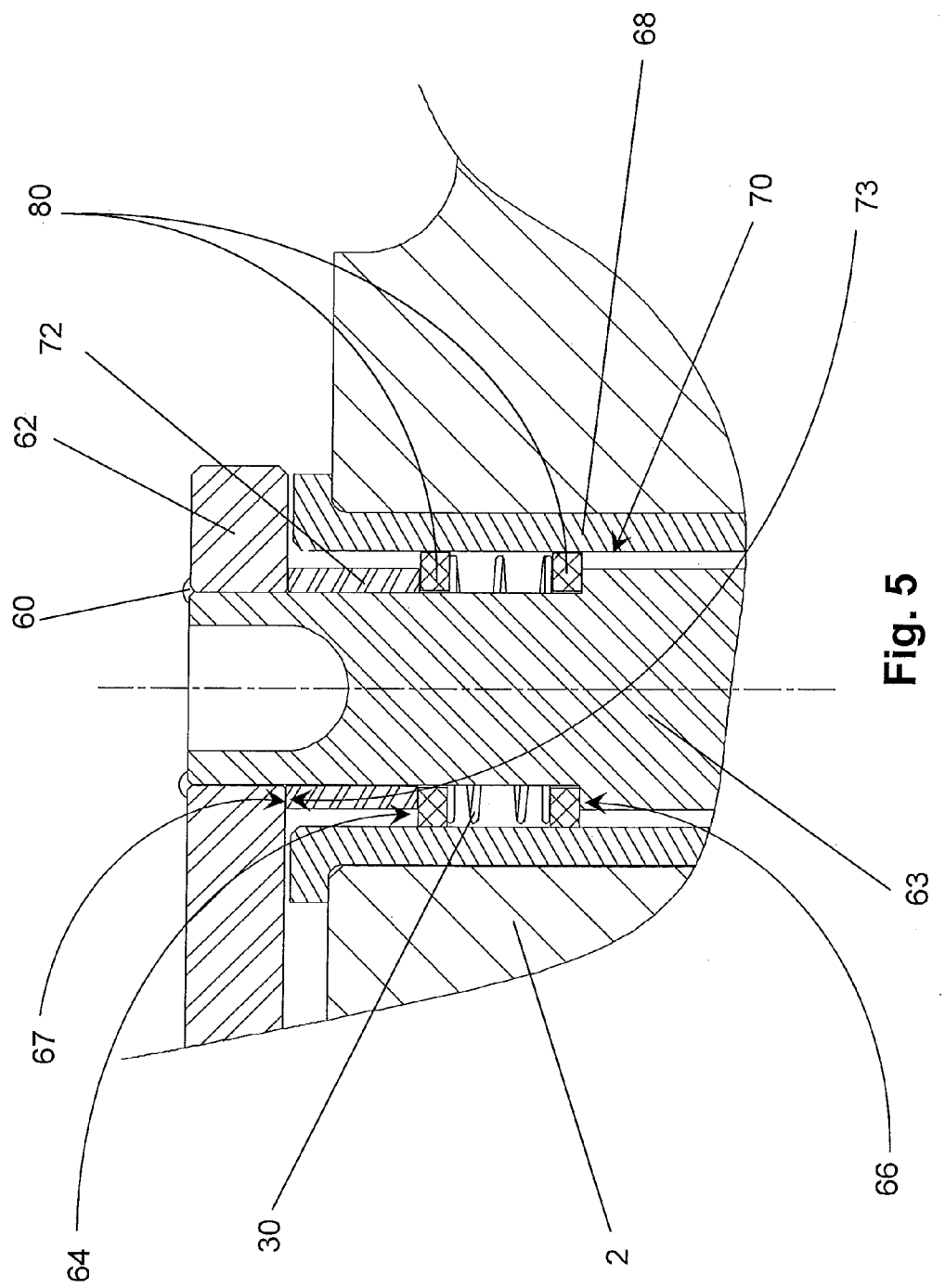
FIG. 5 depicts a magnified section view of FIG. 4.

In the first embodiment of the invention, as depicted in FIG. 4 and presented as a magnified view in FIG. 5, two seal rings (80) are disposed around a rotatable pivot shaft (63), and axially located, on one side, by an annular abutment (66) on the shaft and, on the other side, by the proximate annular end face (64) of a spacer (72). The spacer (72) is radially located by the shaft onto which it is fitted and axially constrained by the interface of the annular distal face (73) of the spacer (72) and the complementary face (67) of the wastegate control arm (62). The wastegate control arm is typically mechanically or chemically/metallurgically fixed to the pivot shaft by an upset or a weld (60). A compression spring (30) is disposed between the two seal rings (80) such that it forces the seal rings apart. The spring could have any design, such as mesh wire or corrugated spring or a Belleville washer, and could be comprised of one or more springs, and if multiple springs, the springs could be "stacked" or could be arranged around the annulus. It is well within the ability of the person of ordinary skill in this art to substitute other spring means for the illustrated coil spring. The spring force of the spring could be widely selected, but a compression force of about 10N has been found to work satisfactorily.

The spring force, applied between the seal rings, forces the seal rings axially apart until the outwards facing surfaces of the seal rings (80) contact the complementary annular sealing surfaces of the abutment (66) of the shaft (63), and the end or abutment (64) of the spacer (72), while in circumferential contact with the inwards facing surface of the bore (70) of the bushing (68), thus providing gas and soot sealing around the pivot shaft and the bore into which it is mounted. This inventive seal provides a gas and soot seal between the inside of the turbocharger and the environment external to the turbocharger.

Figure 6:
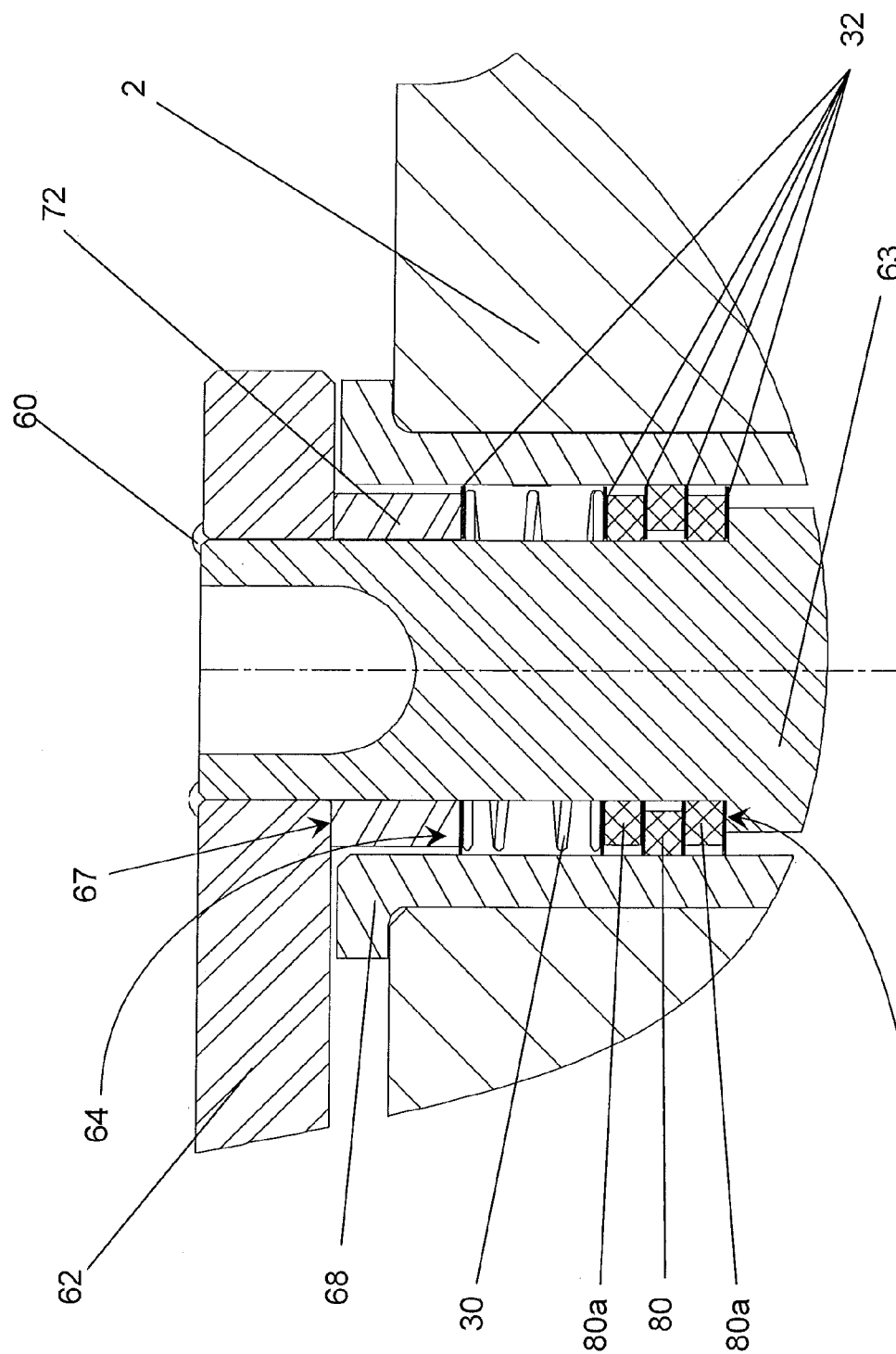
FIG. 6 depicts a view of the second embodiment of the invention.

In a second embodiment of the invention, as depicted in FIG. 6, a plurality of seal rings (80 and 80a) are disposed around a rotatable pivot shaft (63) in alternating inside-diameter-based and outside-diameter-based order. For an inside-diameter-based seal ring the inside diameter of the seal ring, in the collapsed state, approximates the outside diameter of the shaft, and a volume exists between the outside circumferential surface of the seal ring, and the inside diameter of the bore to which it is fitted. For an outside-diameter-based seal ring, the outside diameter of the seal ring, in the collapsed state, approximates the inside diameter of the bore to which it is fitted and a volume exists between the inside circumferential surface of the seal ring and the shaft around which it is assembled.

A spring (30) provides an axial compressive force on the stack of seal rings (80) against an abutment (66) in the pivot shaft (63). The reaction of the spring against the stack of seal rings and the abutment is constrained by a proximate end surface (64) of a spacer (72). As in other embodiments of the invention, the position of the distal end of the spacer is controlled by the lower surface (67) of the wastegate control arm (62) which is mechanically fixed to the pivot shaft by a weld or upset (60). Spacers (32) may be added between the individual seal rings and between the seal ring stack and the spring.

Figure 7:
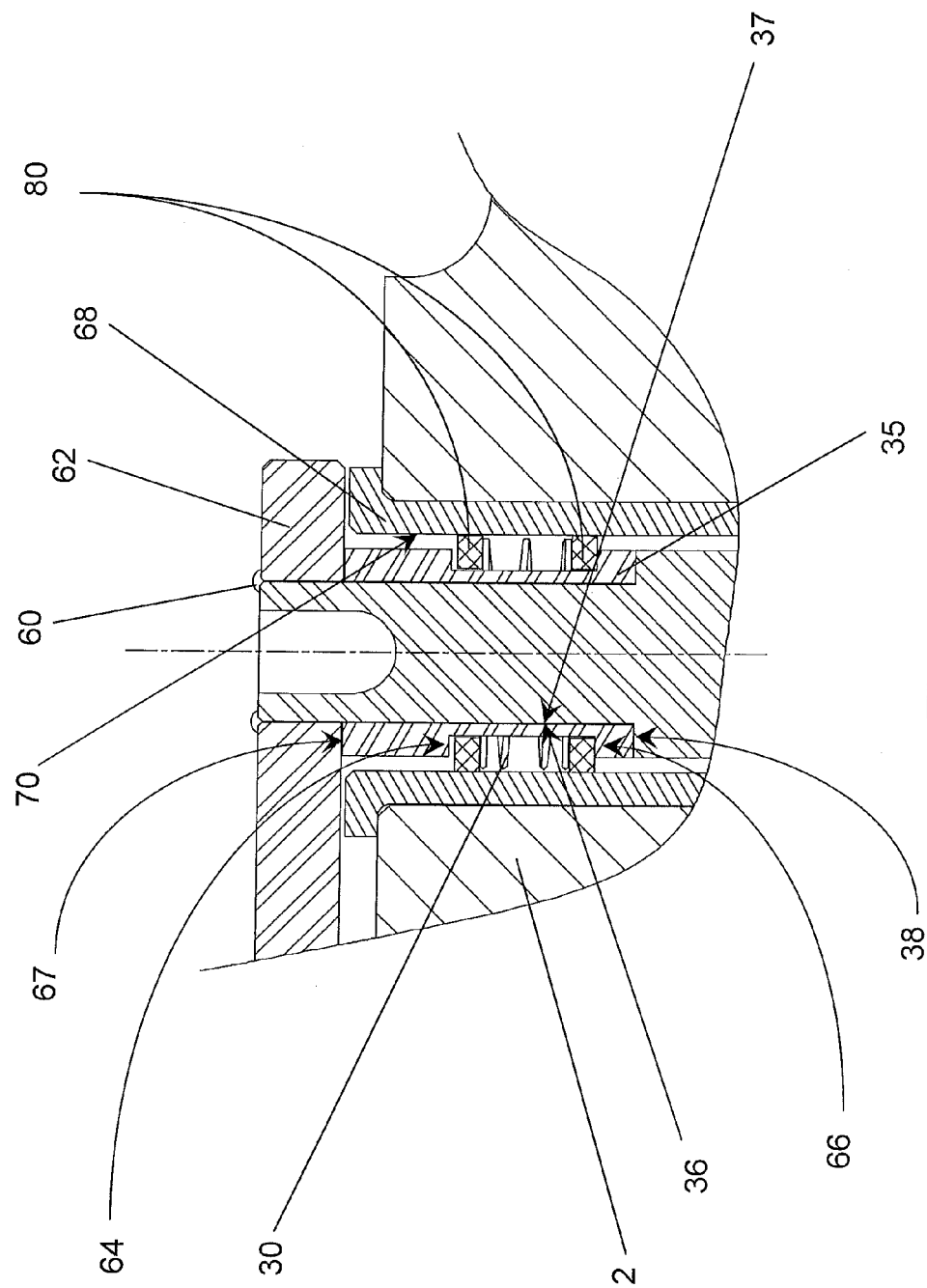
FIG. 7 depicts a view of the third embodiment of the invention.

In a third embodiment of the invention, as depicted in FIG. 7, the plurality of seal rings are pre-assembled onto a holder (35) to ease the assembly of very small components, which are difficult to identify as correctly assembled. At the turbocharger assembly point, the holder, complete with seal rings and spring now known as a "seal pack," is assembled to the turbocharger.

The holder (35) has a generally cylindrical bore (36) which radially locates the holder on a generally cylindrical diameter (37) in the pivot shaft (63). An abutment (38) on the pivot shaft (63) provides a lower axial location and seal for the axially outwards facing lower annular end face of the holder. In a manner similar to that of the upper interface of the spacer (72) and the wastegate arm (62) of the first embodiment of the invention, the upper face of the holder (35) is axially constrained by the interface of the annular distal face of the holder (35) and the complementary face (67) of the wastegate control arm (62).

The spring force applied between the seal rings forces the seal rings axially apart until the outwards facing surfaces of the seal rings (80) contact the complementary inwards facing annular sealing surfaces of the abutment (66) of the holder (35) and the inwards facing lower (as shown in FIG. 5) annular abutment (64) of the holder (35).

The "seal pack" is fitted to the bore in the bushing (68) of the turbocharger by compressing the relaxed seal rings so they fit into the bore (70) of the bushing (68) and then the holder is fitted to the axial abutment (38) on the pivot shaft. The two seal rings are now in circumferential contact with the inwards facing surface of the bore (70) of the bushing (68) thus providing gas and soot sealing around the pivot shaft and the bore into which it is mounted.

This inventive seal provides a constant, reliable gas and soot seal between the inside of the turbocharger and the environment external to the turbocharger.

In a variation to both the first and third embodiments of the invention, multiple seal rings may be fitted in place of the singular seal rings to reduce wear.

We claim:

1. A turbocharger with an actuator (73) located outside the turbocharger for actuating a device within a turbine housing, including a shaft (63) which is rotatably mounted in a bore extending through the turbine housing tor transmitting an actuating movement from the actuating mechanism to the device, wherein at least one of said shaft and said bore is associated with an axially elongate circumferential space having first and second axial ends, wherein at least two generally annular seal members (80) are located in said space, and wherein a mechanical spring means (30) is disposed between said at least two generally annular seal members (80) to spring-bias both seal members axially.

2. The turbocharger as in claim 1 wherein said space is a groove defined axially by an annular abutment (66) at one end and an annular end face (64) of a spacer (72) on the other end.

3. The turbocharger as in claim 2, wherein the groove is defined in the bore in the turbine housing.

4. The turbocharger as in claim 2, wherein the groove is defined in the shaft.

5. The turbocharger as in claim 2, wherein the shaft is mounted in a bore in a bushing extending through the turbine housing.

6. The turbocharger as in claim 5, wherein the groove is provided in the bore in the bushing.

7. The turbocharger as in claim 5, wherein the groove is provided in the shaft.

8. The turbocharger as in claim 2, wherein said groove is in the turbine housing.

9. The turbocharger as in claim 1, wherein the spring means biases at least two seal members in opposite directions.

10. The turbocharger as in claim 1, wherein the spring means biases at least first and second seal members in the same direction, and wherein said first seal member has a different outer diameter and a different inner diameter from said second seal member.

11. The turbocharger as in claim 1, wherein the seal members are seal rings.

12. The turbocharger as in claim 1, wherein the shaft is mounted in a bore in the turbine housing.

13. The turbocharger as in claim 1, wherein the device is a wastegate, wherein an actuator (73) is connected to a wastegate arm (62) via a linkage (74) and the wastegate arm (62) is connected to the wastegate pivot shaft (63), and wherein the wastegate pivot shaft extends through the turbine housing and is connected to the wastegate valve (61).

14. The turbocharger as in claim 1, wherein the device is a variable turbine geometry (VTG) device comprising a unison ring for actuating vanes forming nozzle passages, wherein a VTG actuator is connected to an arm on the actuator shaft, and wherein the actuator shaft extends through the turbine housing and is connected to a link arm connected to the unison ring.

15. The turbocharger as in claim 1, wherein the spring means is selected from helical coil springs, mesh wire springs, corrugated springs and belleville washers.

16. The turbocharger as in claim 1, wherein said spring means comprises multiple springs in either a "stacked" arrangement or arranged around the annulus.

17. The turbocharger as in claim 1, further comprising at least one washer contacting the spring means or at least one seal member.

18. The turbocharger as in claim 1, wherein the plurality of seal rings are pre-assembled onto a holder (35) to form a seal pack.

19. A method for forming it seal between an actuating, mechanism located outside a housing and a device within the housing, wherein the pressure inside the housing is different from the pressure outside the housing, wherein a shaft is rotatably mounted in a bore, wherein the bore extends through the housing wherein the shaft is connected to the actuating mechanism outside the housing and to the device inside the housing for transmitting an actuating movement from the actuating mechanism to the device, the method comprising, in any order: (a) forming an axial abutment in said shaft or bore; (b) introducing at least two seal rings and a mechanical spring such that the mechanical spring is disposed between the at least two seal rings for axially biasing said seat rings onto said shaft or into said bore; (c) a spacer onto said shaft or into said bore such that said seal rings and mechanical spring are located between said abutment and said spacer; (d) introducing said shaft into said bore; and (e) connecting the shaft to the actuating mechanism outside the housing and to the device inside the housing for transmitting an actuating movement from the actuating mechanism to the device.

* * * * *